United States Patent [19]

Burnett

[11] Patent Number: 4,970,467

[45] Date of Patent: Nov. 13, 1990

[54] APPARATUS AND METHOD FOR PULSE PROPAGATION ANALYSIS OF A PIPELINE OR THE LIKE

[76] Inventor: Gale D. Burnett, 9191 Northwood Rd., Lynden, Wash. 98264

[21] Appl. No.: 344,902

[22] Filed: Apr. 27, 1989

[51] Int. Cl.⁵ .............................................. G01R 31/08
[52] U.S. Cl. .................................. 324/637; 324/642; 324/532; 324/534
[58] Field of Search ................ 379/2, 5, 26; 324/637, 324/639, 642, 532, 533, 534

[56] References Cited

U.S. PATENT DOCUMENTS

| | | |
|---|---|---|
| 2,113,749 | 12/1935 | Stathem . |
| 2,570,912 | 10/1951 | Bishop ................................ 324/532 |
| 2,602,834 | 7/1952 | Leslie et al. . |
| 2,725,526 | 11/1955 | Stringfield et al. . |
| 2,887,652 | 5/1959 | Bendayan et al. . |
| 3,600,674 | 8/1971 | Roberts et al. . |
| 3,924,179 | 12/1975 | Doziar . |
| 4,063,161 | 12/1977 | Pardis . |
| 4,118,662 | 10/1978 | Weber . |
| 4,289,019 | 9/1981 | Clayton . |
| 4,291,204 | 9/1981 | Crick . |
| 4,404,514 | 9/1983 | Reichert ............................... 324/533 |
| 4,538,103 | 8/1985 | Cappon . |
| 4,739,276 | 4/1988 | Grauk . |
| 4,755,742 | 7/1988 | Agoston et al. . |

Primary Examiner—Reinhard J. Eisenzopf
Assistant Examiner—Jose M. Solis
Attorney, Agent, or Firm—Hughes & Multer

[57] ABSTRACT

A system for ascertaining the existence and location of anomalies along the length of a member, such as an underground pipeline. Electrical pulses are imparted to the pipeline at opposite ends thereof, with these pulses being synchronized so that they meet at predetermined locations along the length of the pipeline. The wave form of one of the pulses which has passed through the point of intersection is analyzed to determine the possibility of an anomaly being present at the location of intersection. These readings can be correlated to half-cell readings which could be taken along the pipeline as a means of analyzing pipeline conditions.

37 Claims, 16 Drawing Sheets

APPARATUS AND METHOD FOR PULSE PROPAGATION ANALYSIS OF A PIPELINE OR THE LIKE

BACKGROUND OF THE INVENTION

1. Field of the Invention

The present invention relates to an apparatus and method for analyzing conditions along a length of an elongate electrically conductive member, and more particularly to such an apparatus and method which is particularly adapted to detect the presence and location of anomalies along the length of a pipeline, such as an oil or gas pipeline that is buried underground or which extends along a floor of a body of water.

2. Background Art

Pipelines which carry oil or some other fluid are often placed underground and extend for possibly hundreds of miles. Such pipelines are commonly made of metal (e.g., steel) and are wrapped with a protective layer of tape to prevent corrosion of the metal. Even so, the protective layer will sometimes deteriorate at certain locations, or possibly be abraded by some object (e.g., a rock which might come in contact with the protective layer) so as to expose the metal of the pipe to the adjacent ground, resulting in premature pipe corrosion.

In order to alleviate this corrosion of the pipeline, it is common to utilize a source of electrical direct current power to impart a negative charge to the pipeline relative to the adjacent ground. One method is to attach Galvanic anodes to the pipe (e.g. a magnesium anode). Another method is to provide a DC generator with the negative output being attached to the pipeline, while the positive output is connected to an electrode which is placed in the ground. However, this also has its shortcomings. For example, there can be a localized interfering electrical field which may reverse the electrical potential between the pipeline and the ground within an area. This electrical field could result, for example, from an adjacent pipeline which might cross (or extend adjacent to) another pipeline.

Accordingly, the pipeline industry has undertaken to analyze the conditions along the length of the various pipelines to determine the electrical potential between the pipeline and the adjacent ground. The common method of doing this is what is termed the "half-cell" process, which has more or less become the standard of the industry. A typical half-cell comprises a containing member which is a sealed plastic cylinder with a porous ceramic plug. A solution of copper sulphate is in the container and there is a piece of copper which extends into the solution of copper sulfate, with this copper being in turn attached to a wire which is then attached to a volt meter. The other lead of the volt meter would lead to a connection to the actual pipe itself. A somewhat crude method of taking half-cell readings would be to walk along the length of the pipe, dig a hole at selected locations to expose the pipe, attach one electrode to the pipe, and then stick the half-cell in the ground at that location to take a reading. Then the person would proceed to the next location along the pipeline and repeat the same process. However, there are more effective methods of accomplishing this. One method is to connect one end of a cable to the pipe at one location, and have the length of the cable wound on a rotating drum which is in turn mounted to a truck. The truck is then driven down the length of the pipeline for a few miles, with the half-cell being placed in the ground at various locations along the length of the pipeline.

When one realizes that pipelines extend beneath freeways, underneath rivers, underneath the ocean floor, and through other areas of difficult access, it can be seen that there are practical problems in employing the half-cell method. Nevertheless, the half-cell method has in a sense become the standard of the industry, and substantial work has been done in analyzing the data gathered through the half-cell method and correlating this to the condition of pipelines in the soil. The net effect is that there has been for many years a growing problem of substantial magnitude in effective detection of pipeline defects. In the United States alone, there is a vast network of pipelines extending along various routes, and there are conferences held between the various owners/operators of such pipelines to resolve the problems associated with these pipelines (e.g., the electrical field of one pipeline affecting another pipeline adversely). Also, the increasing sensitivity to environmental considerations associated with pipeline leaks is of greater concern. Further, the economic considerations of proper maintenance and functioning of these pipelines is significant.

Another prior art method of analyzing the condition of various objects is time domain reflectometry, where a pulse is transmitted along the length of the member being tested, and at the location of a discontinuity, there is a reflection of the pulse which is sent back to a receiving location (which can be the location at which the pulse was transmitted). By measuring the time increment from the transmission of the pulse to the time the reflection is received, while knowing the velocity of the pulse, the location of the discontinuity can be ascertained. Also, depending on the circumstances, the character of the reflected pulse may yield information about the nature of the discontinuity. While this method has value for certain applications, to the best knowledge of the applicant, this has not proven to be an effective method of analyzing the conditions of pipelines.

A search of the patent literature has disclosed a number of U.S. patents these being the following.

U.S. Pat. No. 4,755,742 (Agoston et al) describes a dual channel time domain reflectometer used to avoid multiple reflections of the test pulse.

U.S. Pat. No. 4,739,276 (Graube) also shows a time domain reflectometer which permits the examination of the magnitude of impedance faults along a cable.

U.S. Pat. No. 4,538,103 (Cappon) shows a time domain reflectometer for testing a cable in conjunction with an oscilloscope or other display apparatus. Positive and negative pulses are generated, and these are synchronized with one another. Both pulses are generated at one end of the cable by the same piece of equipment.

U.S. Pat. No. 4,291,204 (Crick) shows a system which can be used with a time domain reflectometer system. An arc is created to provide a low resistance from which the time domain reflectometry signal is reflected.

U.S. Pat. No. 4,289,019 (Claytor) shows a system for detecting leaks in buried pipes. There is provided a plurality of acoustic detectors associated with the pipe under test. The signals reaching the various pickups are compared and a location of the leak can be determined. In a second embodiment shown in FIG. 4, there are two pickups placed at the same section of the pipe, one to sense longitudinal waves and the other torsional waves. The two outputs are compared and a statistical analysis can be obtained as to the location of the leaks.

U.S. Pat. No. 3,600,674 (Roberts et al.) shows a system in which there is a data carrying cable buried below the pipeline that is to be tested. If the material carried by the pipe leaks, it affects the cable so as to produce conduction discontinuity anomalies in the cable. The discontinuities are in turn measured with a time domain reflectometer to determine the location of the leak. This requires burying the cable with the pipeline.

U.S. Pat. No. 2,887,652 (Bendayan et al.) discloses a system utilizing the principle of time domain reflectometry, this showing some of the earlier work in such systems.

U.S. Pat. No. 2,725,526 (Stringfield et al.) provides the means for determining a line fault by recording the initial surge that starts the fault and the reflected signals. By timing the arrival of various parts of the initial signal and the reflected signals, the location of the fault may be determined.

U.S. Pat. No. 2,602,834 (Leslie et al.) shows a device for locating faults in transmission lines, utilizing reflected wave technology for fault detection. There is a source of RF energy that is coupled to the line under test and a receiving system. The RF pulse is generated and sent down the line and if there is a fault in the line, a signal is reflected back. The nature and timing of the reflected signal is an indication of the fault and its location. This again depends upon the reflected signal to determine the fault.

U.S. Pat. No. 4,118,662 (Weber) shows a system for locating underground structures such as pipelines by the injection of a signal that is detected by equipment carried by an operator.

U.S. Pat. No. 4,063,161 (Pardis) shows a means for detection of faults in a cable by propagating a pulse into the cable and detecting the leakage point by profiling the ground potentials. Thus, it would not be possible to utilize this system effectively where the location of the fault is in an inaccessible area.

U.S. Pat. No. 3,924,179 (Dozier) discloses a means of finding a single "dead" wire in a cable bundle by observing the effect of a DC pulse being passed through the cable and detecting the generated field with a receiving instrument.

U.S. Pat. No. 2,113,749 (Statham) discloses a geophysical prospecting system where a series of signals are generated into the earth, and the propagation of the signals through the geophysical formations is determined.

SUMMARY OF THE INVENTION

The method and system of the present invention are arranged to detect an anomaly along a member having a lengthwise axis. Within the broader scope of the present invention, this term anomaly is intended to be interpreted more broadly to include various changes in the physical condition of the member, or even effects of ambient conditions relative to the member (including ambient electrical conditions).

The system and method of the present invention are particularly well adapted to ascertain such anomalies along the length of a pipeline, such as an underground pipeline which transmits fuel. More particularly, it has been found that the present invention can provide data of conditions along the length of the pipeline which can be correlated with the data derived by standard prior art methods, such as the "half-cell" method which is the present standard in the industry.

It has also been demonstrated that the present invention can be used to ascertain other anomalies. For example, a change of material in the elongate member can be detected, and also a change in electrical conductivity. On the basis of experimental data so far, it is surmised that other physical conditions, such as change in physical structure of the member can also be detected.

In the method of the present invention, a first electrical pulse is sent from a first location on a lengthwise axis of the member, with this pulse traveling toward a second location on the axis. A second electrical pulse is sent from a second location on the axis toward the first location, with the second pulse being synchronized with the first pulse in a manner that there is an intersection of said first and second pulses at a first intersecting location along the axis.

At least one of the first and second pulses is detected and analyzed after passing through the intersecting location to ascertain modifications of said one of said pulses. In this manner, by correlating certain modifications in the pulse or pulses and also ascertaining the location of the intersection, the location of the region of the anomaly can be ascertained.

Desirably, a series of first and second pulses are transmitted, these being synchronized to cause the location of the intersection of the pulses to move to different intersecting locations.

Wave form variations between pulses can be compared to ascertain a region of possible anomaly and also its nature. Also amplitude variations between the pulses can be compared to ascertain the regions of anomaly, and the degree and severity of the anomaly.

In a particular embodiment, first and second pulses of different voltages are transmitted through the member. More specifically, one of the pulses is at a negative electrical potential, while the other of said pulses is at a positive electrical potential. The duration of the pulses can vary, depending upon the length of the member and other factors, but it is expected that the duration of the pulses would be between zero to one microsecond.

The velocity of the pulses can be determined by measuring a time period during which a pulse is transmitted a predetermined distance along the axis. When the velocity of the pulse is known, the intersecting location can be moved predetermined increments of distance along the axis by changing synchronization of the pulses by time increments corresponding to distance of movement of the intersecting location along the axis.

In the system of the present invention, first and second transmitting means are provided to transmit the first and second pulses. Synchronizing means is provided to synchronize the pulses and also to step the point of intersection along the axis. There is also detecting and analyzing means operably connected to the member to receive at least one of the first and second pulses.

Other features of the present invention will be apparent from the following detailed description.

DESCRIPTION OF THE PREFERRED EMBODIMENTS

It is believed that a clearer understanding of the present invention will be achieved by first describing in a rather simplified form the basic operation of the present invention. This will be followed by a description of two series of tests to demonstrate the basic principles of the present invention. Finally, there will be described a system by which the invention can be applied in a full scale commercial application, as in analyzing the integrity of an existing pipeline.

Figure 1:
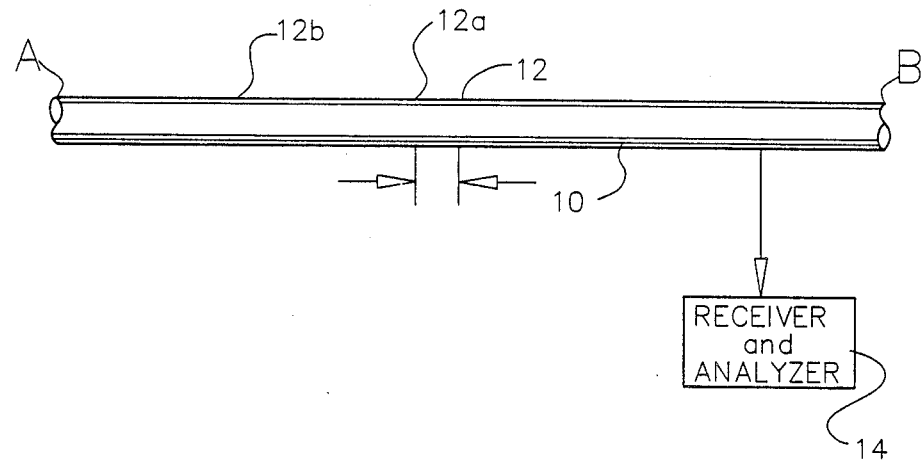
FIG. 1 is a somewhat schematic view illustrating a pipe and showing a simplified process of the present invention.

Reference is made to FIG. 1, where there is shown a length of steel pipe 10 having two end locations A and B. A first electrical pulse of short duration is imparted to the pipe 10 at location A, and at the same time a second electric pulse is imparted to the pipe at location B. On the assumption that the two pulses travel toward each other at the same rate of velocity (e.g., approximately one-half foot per nano-second), these two pulses will meet at a center location 12. It is to be expected that as these two pulses meet, they will interact with each other in some manner, with the modified pulse from point A traveling beyond the middle point of intersection at 12 toward a receiver and analyzer 14. In like manner, the pulse emitted from point B will travel beyond the intersection 12 toward point A. There may also be patterns of reflecting wave forms at various locations along the length of the pipe 10.

Let it now be assumed that the pulse at point A is delayed by two nano-seconds relative to the time at which the pulse at point B is initiated. In this situation, the pulse at point B gets a two nano second "headstart". In that two nano-second headstart interval, the pulse B (traveling at a rate of one half foot per nano-second) will have traveled one foot farther down the pipe 10 than pulse A, so that pulse A and pulse B will intersect at a location 12a which is one half foot closer to point A than the original point of intersection 12 which is equally distant between point A and point B. The pulse A will again be modified at the point of intersection and proceed on toward point B, and this modified pulse A will again be detected by the receiver and analyzer 14. In like manner, by adjusting the delays of the times at which the pulses are emitted from point A and point B, the points of intersection 12, 12a, etc. can be "stepped along" the length of the pipe 10 to any location between the points A and B.

It has been discovered that if there are certain anomalies (this term anomaly being used in a broad sense) at the point of intersection (e.g. 12 or 12a), the signature or wave form of the modified pulse after passing through the point of intersection will be different than it would be if this anomaly did not exist at the region of the intersection. It has further been discovered that this particular signature is not present if only a single pulse is generated to pass through the region of anomaly and then to be detected by the receiver and analyzer 14.

To explain this further, let it be assumed that there is a certain anomaly in the pipe at location 12b. Let it further be assumed that a pulse is emitted from point A, but no corresponding pulse is emitted from point B. The pulse from point A will travel through the region of anomaly at 12b and arrive at the receiver and analyzer 14, and the signature of this single pulse A is recorded. Let it now be assumed that the same pulse A is transmitted from point A, but there is no anomaly at region 12b, and this same pulse reaches the receiver and the analyzer 14, with its signature being recorded. Depending upon the nature of the sort of anomaly that might exist at 12b, the nature of the anomaly may or may not be ascertainable by analyzing the form of the pulse from A, and even if it is identified, it would be difficult to determine the location of such anomaly along the length of the pipe.

However, let us take the same situation as indicated above, and let us now assume that the pulses are emitted from both points A and B at spaced time intervals, so that the point of intersection is "stepped along" the pipe 10, as described above. It has been found that as the point of intersection is stepped along the pipe 10, a first signature pulse from point A passing through the point of intersection of pulses A and B will produce a certain signature at such time as the point of intersection is at an area of no anomaly. However, at such time as the point of intersection is in the region of the anomaly at 12b, then a different recognizable signature is given to the pulse A, and by comparing this modified signature with the previous signature, it can be recognized that an anomaly is present. Further, since the time interval between the transmitting of the pulses A and B can be accurately predetermined, it is then possible to recognize not only the presence of the anomaly at 12b, but also the location of the anomaly. In another sense, we can consider the pulses from points A and B intersecting to create an interference pattern. This interference pattern will have one signature when the intersecting location is at an area of no anomaly, and the interference pattern will have a different signature when the intersecting location is at an area of anomaly.

To relate this invention more closely to the problems associated with pipelines, it has further been discovered that this method described above is able to detect the presence and location of anomalies along the length of underground pipe where the nature of the anomalies are changes in the electrical potential between the pipe and the adjacent ground location. Beyond that, it has been discovered that the detection of such anomalies in an underground pipe by the method of the present invention can be correlated to the measurements which would be obtained by the half-cell method described previously under "Background Art".

To truly appreciate the significance of the present invention relative to underground pipes, two things must be recognized. First with the present invention, there needs to be access to the pipe 10 at only three locations, Namely the two locations A and B at which the two pulses are imparted to the pipe 10, and also the location of the receiver and analyzer, which can be adjacent to either of the locations A and B. Normally, these points would be easily accessible on most any pipeline installation. Second, if the data obtained by the present invention can be correlated to data which would be developed by the half-cell method on that same length of pipe, this opens the doors to the immense amount of analysis and data available from the half-cell method, but without the necessity of doing all the physical work associated with the half-cell method.

To explain this yet further let us assume that the pipe 10 is an oil pipeline which is buried in the ground beneath a body of water, and that the locations A and B are pipeline locations on opposite sides of the body of water, with the location of the receiver and analyzer 14 being adjacent to the point B. By use of the present invention, the timing of the pulses emitted at A and B can be adjusted so that the points of intersection (i.e. 12, 12a, etc.) can be stepped along the entire length of the pipe 10 beneath the body of water. At the location where the point of pulse intersection (e.g. 12 or 12a) is in the region of the area of the anomaly location 12b, the signature of the pulse emitted from point A will be modified in a manner which will indicate the anomaly. By knowing the timing of the two pulses A and B, the location 12b will be known. Then further examination (and repair if needed) could be conducted at the location 12b without searching along the entire length of the pipeline for the anomaly.

EXAMPLE I

To demonstrate these principles further, the following experiment was conducted. Six sections of steel pipe, each being ten and a half feet long, were connected by steel couplers to make a pipe length of sixty-three feet. This pipe had a one-half inch inside diameter and approximately one-inch outside diameter. Each ten and a half foot sections of pipe was wrapped with a different type of insulating tape. More specifically, beginning with the first pipe section being indicated at 1, and the subsequent pipe sections in order being designated 2, 3, 4, 5 and 6, the type of tape which was used on each such section is listed below:

1. plastic wrapping tape
2. black cloth tape
3. 3M pipeline wrapping tape
4. glass fibre tape
5. standard duct tape
6. masking tape Further, one of the ten and a half foot pipe sections (i.e., section number 5 which was wrapped with standard tape) was deliberately wrapped rather poorly so that there were gaps between the helical windings of the tape, with the total gap area being approximately three percent to five percent of the total exterior surface of this ten and a half foot section of pipe. This was done to simulate a condition in a pipeline where portions of the insulating tape for the pipe would be damaged or deteriorated so that bare pipe was exposed to the ground. The remaining five pipe sections were wrapped so that their entire surface areas were covered.

This sixty-three foot section of pipe was buried in the soil at a depth of approximately 36 inches, with the soil being a rather uniform sandy soil. The six different wrappings of tape were used to produce different pipe-to-soil conditions so as to simulate the conditions which might be encountered in a longer length of pipe which would extend through different soil conditions.

Figure 2:
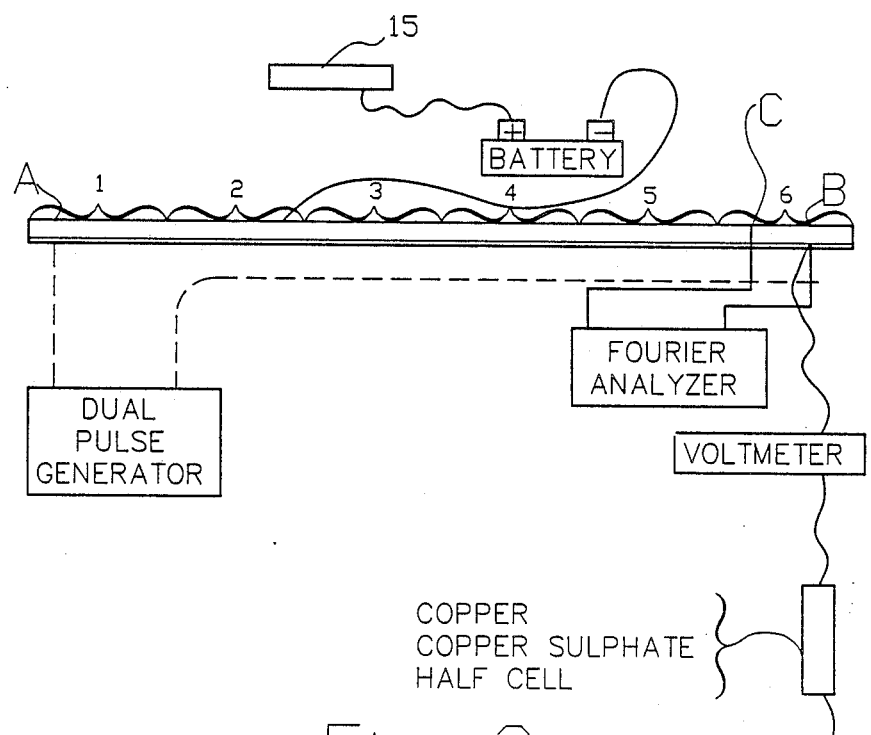
FIG. 2 is a view similar to FIG. 1, showing somewhat schematically a test set up used in accomplishing the experiments outlined in Example I described in this application.

Electrically conducting cables were connected at locations three and one half feet in from the opposite ends of each pipe, indicated at A and B in FIG. 2. A programmable dual pulse generator, number 8161A manufactured by Hewlett Packard was attached to the free ends of the two cables, the opposite ends of which were attached to points A and B of the 63 foot length of pipe, respectively, so that points A and B were 56 feet apart. In this particular test setup, the cable which was attached to point B was, for convenience, extended along the trench to the location of point A, and then both the cables were positioned adjacent to one another and connected to the programmable dual pulse generator. Thus, the cable extending to point B was about 56 feet longer than the cable extending from point A. In the actual experiment which will be described below, to synchronize the pulses, this difference in cable length was taken into consideration so that the points of intersection of the pulses were properly stepped along the length of the 63 foot pipe.

To receive and analyze the pulses, a Fourier Analyzer was connected to the pipes at point C, which was spaced from point B about five feet toward point A. Channel 1 of the Fourier Analyzer was attached to point C, while channel 2 of the Fourier Analyzer was attached to point B. In the latter phase of this experiment a digital oscilloscope (No. 2430A made by Tektronics) was substituted for the Fourier Analyzer.

To impart a DC voltage to the 63 foot length of pipe, the negative terminal of a six volt battery charger was connected directly to the pipe 15 at 40 feet from point B, and the positive terminal of the battery was connected to an anode, with this anode being a twelve foot section of 2½ inch inside diameter steel pipe which was buried in the soil to a depth of about three feet at a location fifty feet away from the pipe 15.

Figure 3:
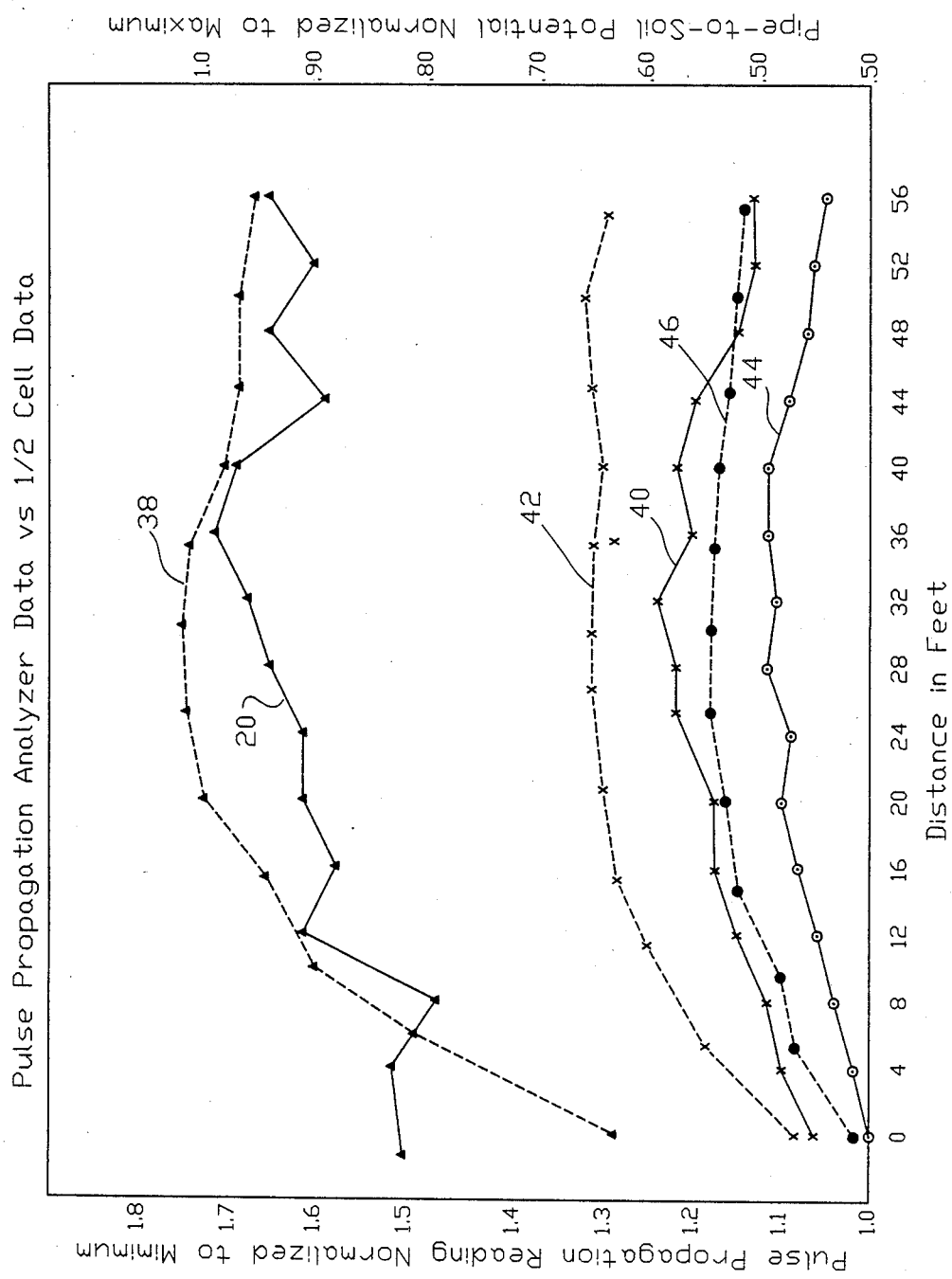
FIG. 3 is a graph illustrating readings taken along the length of a pipe using the half-cell method, and also utilizing the method of the present invention.

Next, a series of half-cell readings were taken along the length of the pipe at regularly spaced intervals which were about one foot from each other. This was done by manually moving the half-cell to ground locations immediately above the pipe, and then sticking the half-cell in the ground to a depth of about one inch. Then a volt-meter which was connected between the half-cell and point B on the pipe was read to obtain a pipe-to-soil-potential (PSP) at each location. The result of these half-cell readings are shown in the graph of FIG. 3, by the solid line identified at 20. The X axis extending along the bottom of the graph represent the location in feet along the length of the pipe at which the readings were taken. The Y axis which appears on the right of the graph at FIG. 3 represents the pipe-to-soil-potential (i.e. the pipe potential relative to the ground) and for purposes of illustration, these values have been normalized so that the numeral 1 represents the highest voltage reading taken while zero would represent no voltage. Actually the maximum ground potential that was measured was close to three volts.

Next, the method of the present invention was utilized to determine if there would be a correlation between the values obtained by the half-cell readings and those obtained by the present invention. Pulses of twenty nano second duration were imparted to points A and B at accurately timed intervals so that the points of intersection could be "stepped along" the length of pipe as described previously herein.

The pulse emitted from point A was a negative pulse of three volts, while the pulse emitted from point B was a positive pulse of three volts.

It should be pointed out that to obtain a reading at a point of intersection along the pipe, only a single pulse was emitted at point A and a second single pulse emitted from point B, with these pulses being synchronized very accurately so that the point of intersection could be ascertained within a tolerance of about one quarter of an inch. Then after a period of 0.25 seconds, a second pair of pulses were imparted to the pipe at points A and B, with the pulses being synchronized so that the point of intersection was stepped along the length of the pipe at an interval of about twenty four inches. The signature of each of these pulses as received at point C was analyzed to see what meaningful information could be gathered.

To describe the sort of wave forms which were recorded by the Fourier Analyzer and later by the oscilloscope, reference is made first to FIG. 4 where the voltage is plotted along the vertical Y axis and time is plotted along the horizontal X axis. It can be seen that at point 30, there is a very abrupt positive voltage spike. This represents the time at which the positive pulse emitted from point B passes point C which is the receiving location. After producing the spike at point 30, the pulse from point B proceeds along the length of the pipe toward point A and meets the negative pulse from point A at a point of intersection so that the two pulses from points A and B interact in some manner. The pulse emitted from point A after passing through the point of intersection with the pulse from point B then arrives at the sensing location C. In this particular graph, the point indicated at 32 represents the time at which the leading edge of the pulse emitted from point A reaches the sensing location C. A short increment of time later, there is a lower peak value indicated at location 34 on the graph of FIG. 4. The amplitude (i.e. voltage difference) between the points 32 and 34 was measured, and this was found to be minus 105 millivolts.

Figure 4:
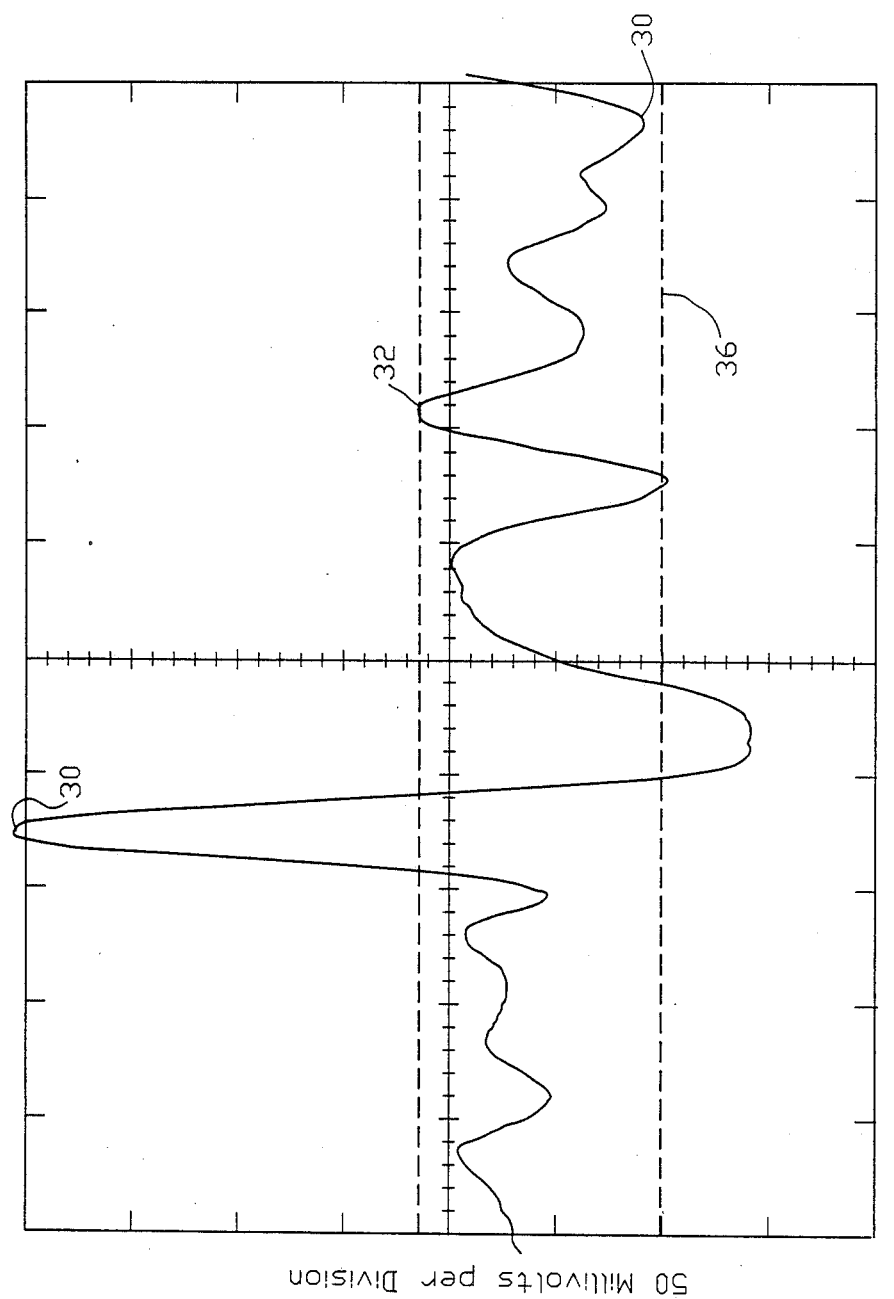
FIGS. 4 and 5 are graphs illustrating wave forms produced in the process of the present invention performed in accordance with Example I.

It should be pointed out that there are likely a number of influences causing the wave form shown in the graph of FIG. 4, such as reflected waves because of various conditions, etc.

Figure 5:
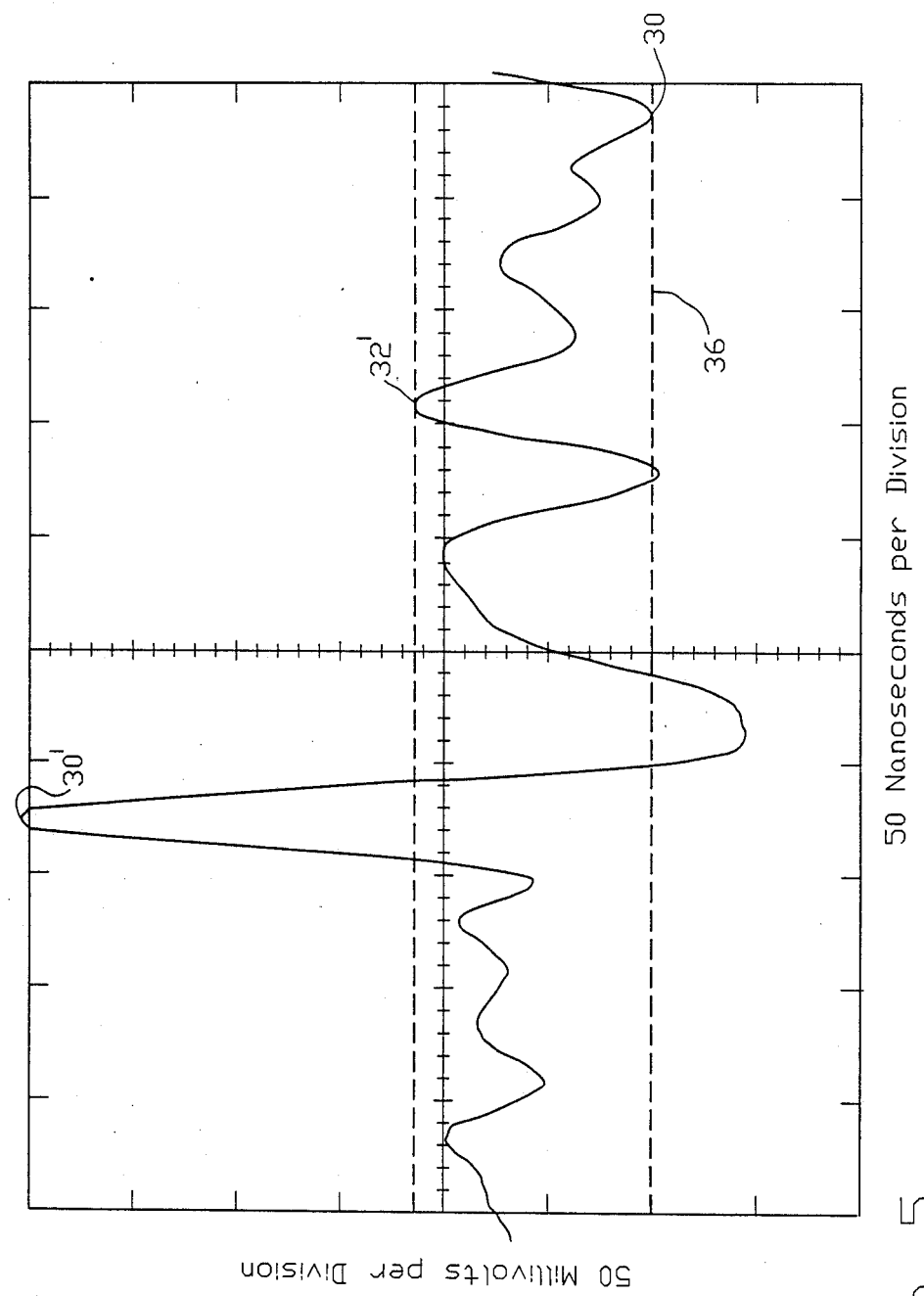

Next, attention is directed to the graph of FIG. 5, and this is essentially the same type of graph as shown in FIG. 4, except that the point of intersection of the two pulses emitted from points A and B has been moved. There is the point 30' at which the pulse at point B passes the sensing location C, and there are also the second two points 32' and 34', which correspond to the points 32 and 34 on the graph at FIG. 4. For purposes of comparison, a lower dotted line 36 is drawn at the graph of FIG. 5 to indicate the voltage level at point 34', and this same line 36 is drawn on the graph of FIG. 4. It can be seen that the amplitude between the points 32' and 34' is moderately greater than the amplitude of the corresponding points 32 and 34 on the graph at FIG. 4. The voltage difference between the points 32' and 34' is 112 millivolts (as seen in FIG. 5) as compared with a 105 millivolts as seen in FIG. 4. It should be noted that the pipe-to-soil-potential at the locations corresponding to those of FIGS. 4 and 5 were 1.29 and 1.21, respectively. The ratio of 105 millivolts to 112 millivolts (0.9375) is nearly the same as the ratio of 1.21 volts to 1.29 volts (0.9380), which gives further confirmation that the readings obtained by the present invention correspond to the pipe-to-soil-potential readings.

It is to be understood that the graphs at FIG. 4 and FIG. 5 simply represent the signatures of two different pulses having different points of intersection along the length of the 63 foot pipe. In continuing the experiment, the points of intersection of the pulses emitted from points A and B were stepped along the entire length of the pipe by properly synchronizing the pulses emitted from points A and B. The readings were taken from each graph (such as those shown at FIGS. 4 and 5), and specifically the amplitude values were measured (as indicated above between the points 32 and 34 of the graph at FIG. 4 and the points 32' and 34' from the graph of FIG. 5. The results were also plotted and are indicated by the broken line at 38 in the graph of FIG. 3. The values for the amplitude of the signal in FIG. 3 are plotted along the left vertical line of the graph, and these also have been normalized to present the inverse of the values between the highest and lowest amplitude. This was done so that the correlation between the half-cell readings and those of the method of the present invention can be viewed on the graph of FIG. 3.

Also in the graph of FIG. 3, there is shown a second solid line 40 which represents the readings taken by the half-cell method with the DC voltage being imparted to the 63 foot pipe being about three volts instead of the 6 volts which was applied to obtain the readings shown in the lines 38 and 20. The readings taken from the method of the present invention are indicated at the broken line of graph 42.

Yet another set of readings was obtained under circumstances where the DC voltage applied to the pipe was about two volts, with the solid line 44 representing the half-cell readings, and the broken line 46 representing the readings taken by the intersecting pulse method of the present invention.

Figure 6:
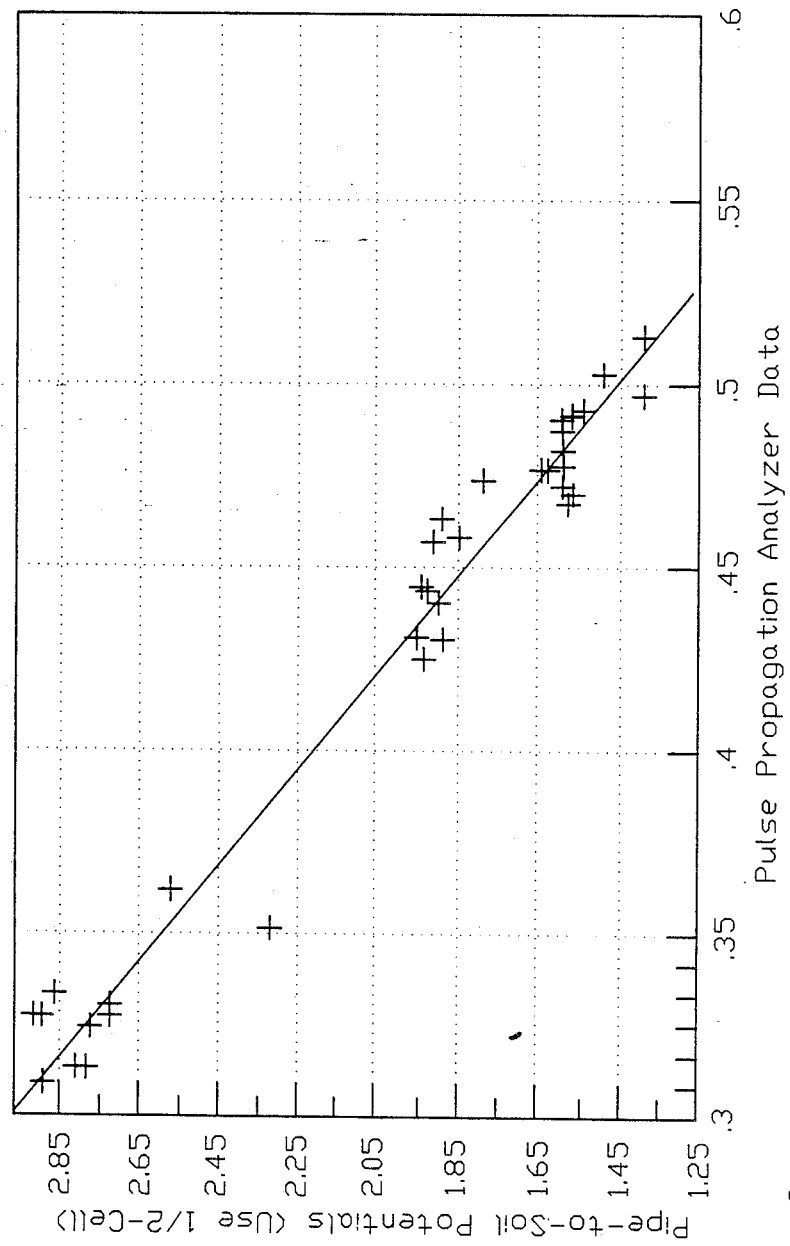
FIG. 6 is a graph by which the values obtained in the graph of FIG. 3 are shown in relation to a correlation curve.
Figure 7:
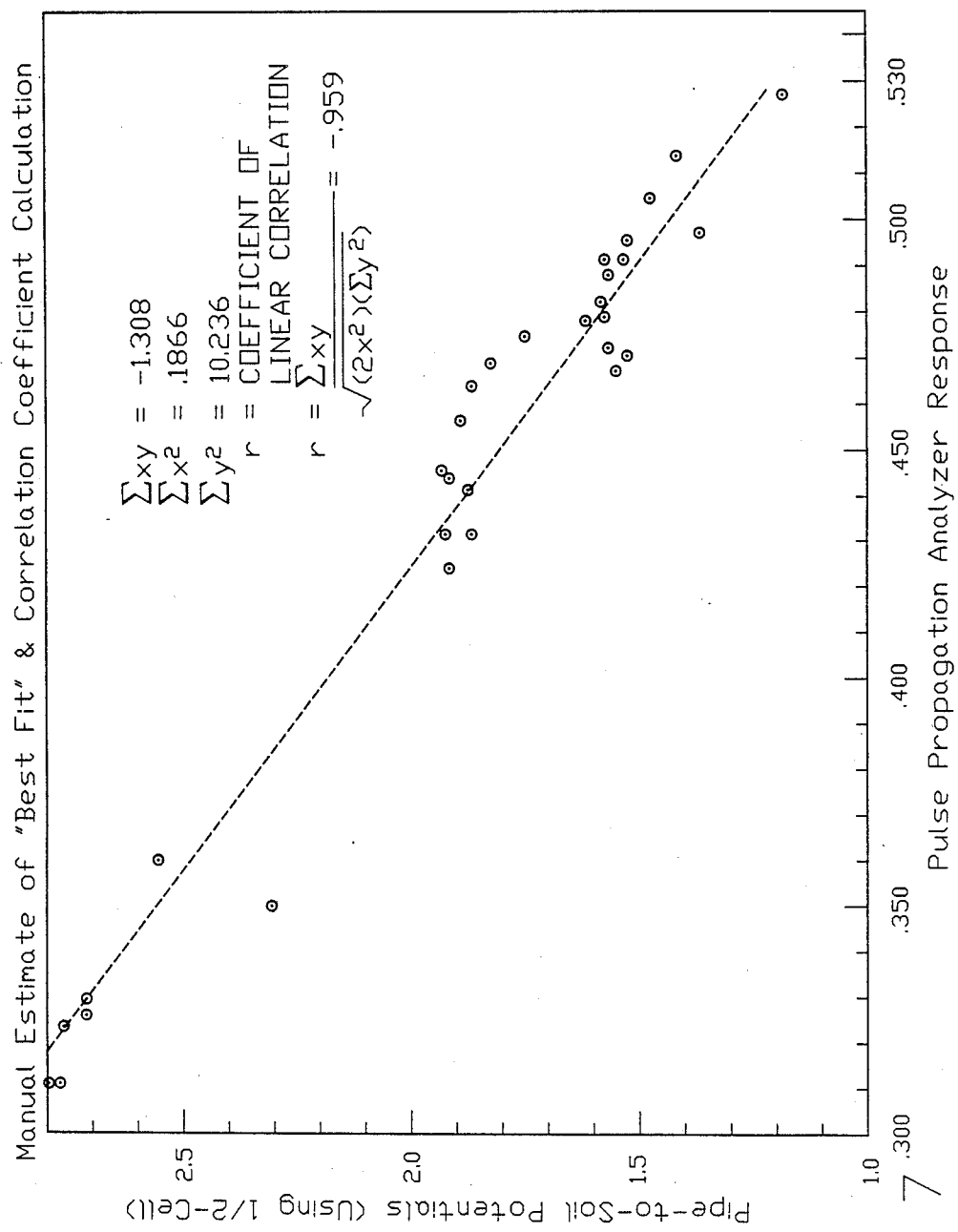
FIG. 7 is a graph similar to FIG. 6 showing these values in a correlation curve.

The correlation between the two sets of values is evident from viewing the graphs of FIG. 3. To further demonstrate this correlation, reference is made to FIG. 6. Along the vertical y axis, there are negative pipe-to-soil-potentials as measured by the half-cell at various locations along the length of the pipe. Along the horizontal X axis there are the values of the amplitude of that portion of the signature of the signal derived by the process of the present invention (i.e. the amplitude between points 32 and 34, 32' and 34' etc.). The diagonal line which is shown in FIG. 6 is a statistical "best fit" curve which was drawn by a computer to correlate the data points which are illustrated in that draft. FIG. 7 is a graph showing substantially the same information as the graph of FIG. 6, except that there is shown in addition the formula for obtaining the correlation coefficient. It can be seen that a correlation coefficient of 0.959 was obtained. (A correlation coefficient of one would show perfect correlation, while a correlation coefficient of zero would show no correlation.)

To recognize the significance of what is demonstrated by the experiments described under "Example 1" it bears repeating what was stated earlier herein, namely that being able to correlate the readings obtained by the methods of the present invention with readings which are obtained by the half-cell method opens the door to vast amounts of data and information derived therefrom as to the condition of a pipe line. For example, if one skilled in this industry is able to view half-cell data along the length of a pipe line, that person will be able to interpret that information in view of the vast amount of background information that is available regarding half-cell readings, and then draw certain conclusions about the conditions along various portions of that pipe line. With the present invention, the person is able to take the readings by the method of the present invention and obtain a set of data, and from this set of data ascertain within reasonable tolerances what the half-cell readings would be along that same length of pipe. However, it is to be recognized that further analysis obtained by the present invention may well lead to additional information which would not be available by the half-cell method.

As indicated above, in order to obtain some correlation of the data obtained by the present invention with the half-cell data, a certain section of the pulse signature was analyzed (as described previously herein with reference to FIGS. 4 and 5) and an amplitude value was obtained. Beyond this, it is contemplated that as more data is accumulated, the pulse signatures obtained under various conditions can be catalogued and compared, and yet further relationships may be ascertainable. Thus, it is to be recognized that the value of the method of the present invention is not intended to be limited to the particular analysis as described herein with reference to FIGS. 4 and 5.

EXAMPLE II

In Example I, it was demonstrated that the method of the present invention could be utilized to determine anomalies or variations along the length of a pipe line that correspond to the ground potential readings as taken by the half-cell method. To demonstrate that other types of anomalies could also be ascertained, the following set of experiments was performed.

Figure 8:
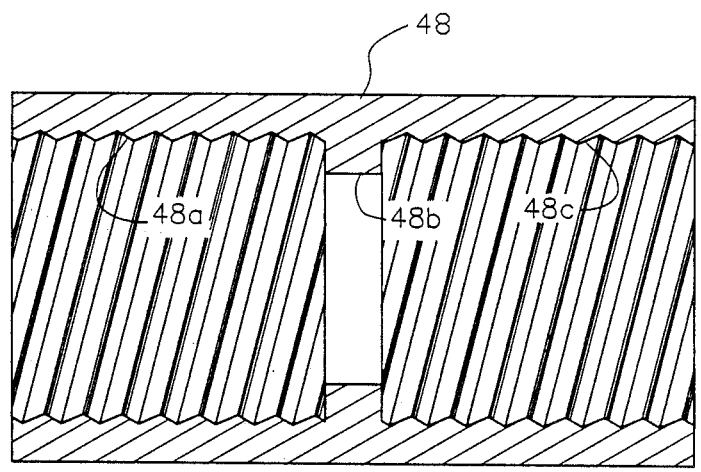
FIG. 8 is a longitudinal sectional view of a coupler used in conjunction with experiments performed as described in Example II herein.

A twenty one foot length of steel pipe was cut in half to make two 10 and ½ foot pipe sections 47 and these were first joined by a metal coupler 48 as shown in FIG. 8. This metal coupler had a cylindrical configuration with two sets of interior threads 48a formed at the end portions. There was an annular inwardly radially extending flange 48b to act as a stop member between the two pieces of pipe. The two ends of the pipe were formed with threads and then threaded into the ends of the coupler 48 so that the pipe ends were about ⅛th of an inch apart. The two ends of the pipe were supported above the ground on two insulating support members 47c, respectfully, made of styrofoam, and a series of tests were run by imparting pulses to the opposite ends of the pipe in generally the same manner as described in example I. This test set up is shown schematically in FIG. 9. Then these same two sections of pipe were joined together by a plastic coupler, having the same configuration as the metal coupler of FIG. 8, and a second set of tests were run.

Figure 9:
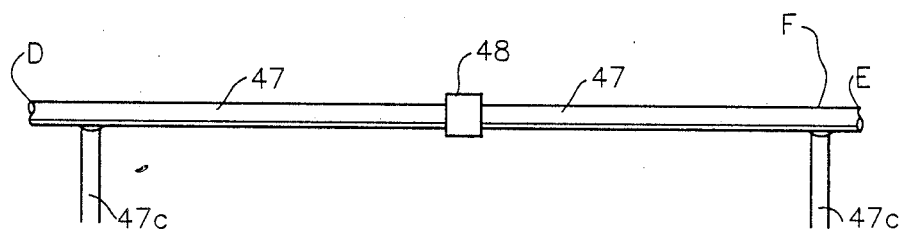
FIG. 9 is somewhat schematic showing of the test set up utilized in the experiments described in Example II of the present invention.

As with Example I, a programmable dual pulse generator, number 8161A manufactured by Hewlett Packard was attached to the free ends of two electrically conductive cables the other ends of the two cables were attached to opposite ends of the 21 foot pipe. In this instance, the duration of the pulses was 5 nano seconds, with a negative three volt pulse being imparted to point D, as shown in FIG. 9, and a second pulse being imparted at point E at the opposite end of the 21 foot pipe length. In this instance, the point F at which the receiver and analyzer was connected was one foot from point E. The receiving and analyzing unit used in this second experiment was a digital oscilloscope manufactured by Tektronics, number 2430A. The two cables that were connected from the ends of the pipe to the dual pulse generator were of equal length.

Figure 10P:
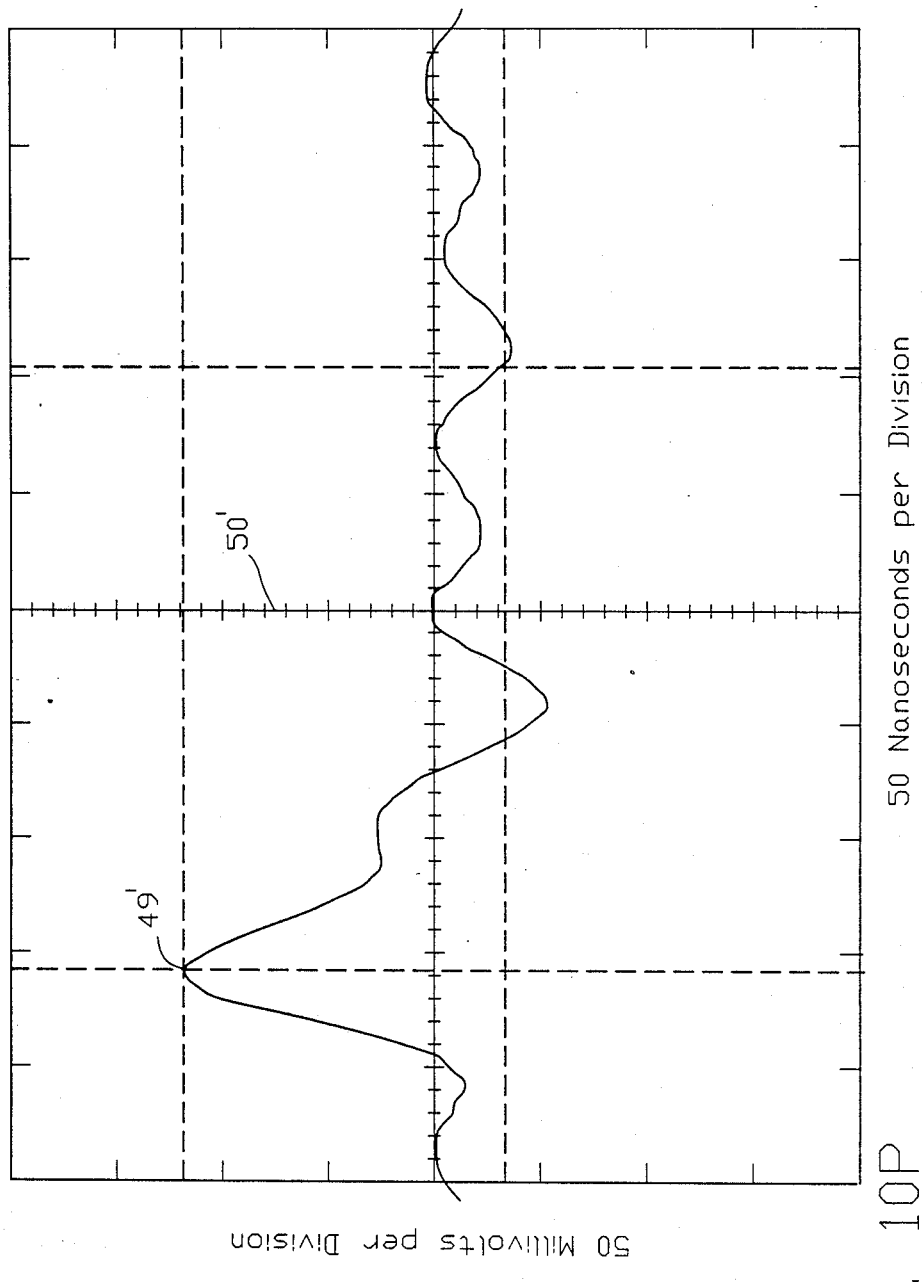
FIGS. 10p, 11p, 12p and 13p are a series of graphs illustrating the wave forms performed in the experiments described in Example II herein, where a plastic coupler was used to connect the two pipe sections.
Figure 10M:
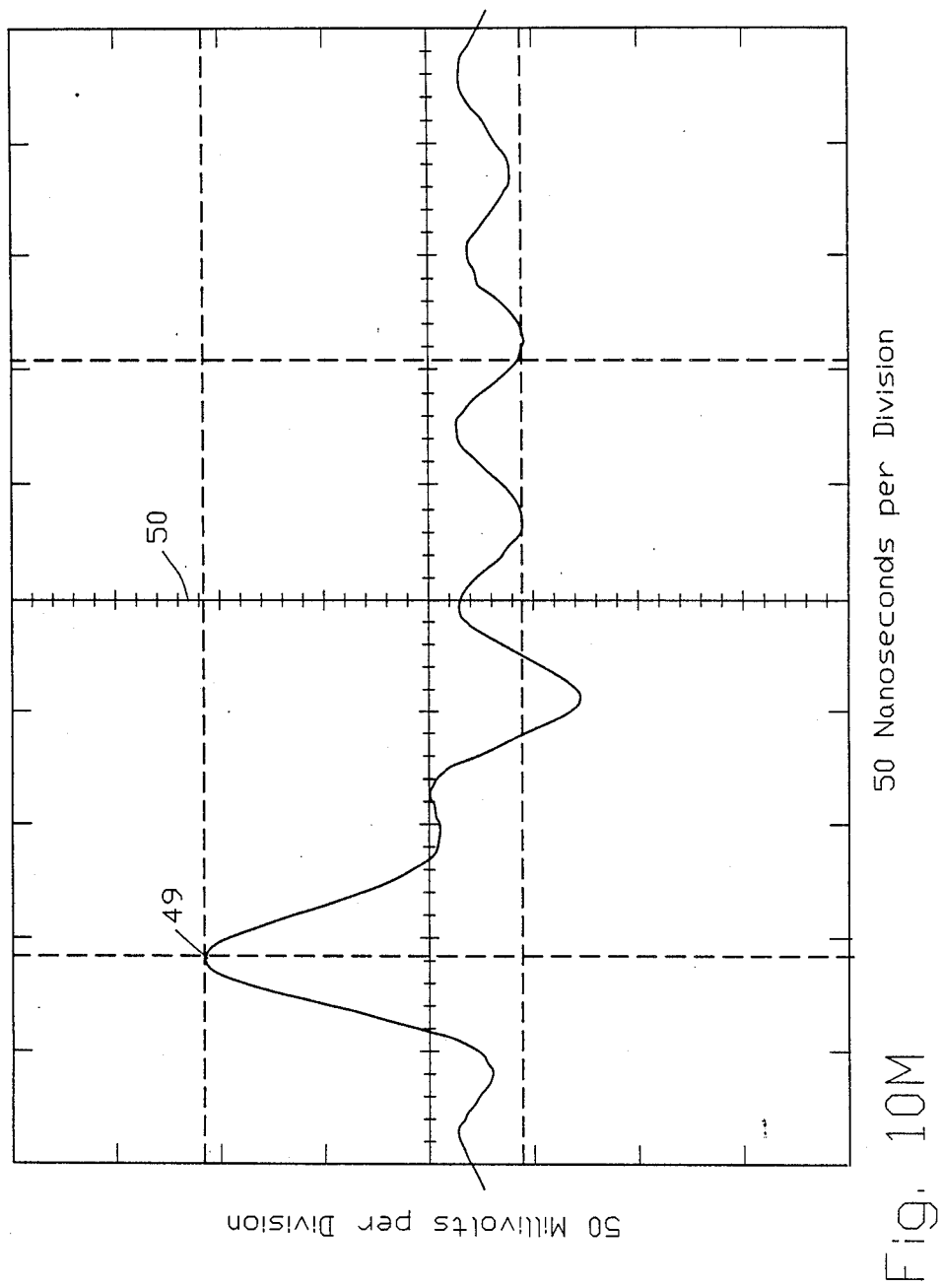
FIGS. 10m, 11m, 12m and 13m are a second set of graphs showing wave forms produced in accordance with the experiments described in Example II, with a metal coupler joining the two pipe sections.

A first test was run by imparting a negative pulse to the pipe at point E, but with no synchronized pulse being imparted to point D. This was done first with the metal coupler 48 joining the two lengths of 10½ foot pipe, and then with the plastic coupler joining these same two lengths of pipe. FIG. 10m illustrates the wave form obtained with the metal coupler. The point 49 represents the time at which the pulse traveling from point E passes point F, and it can been seen that the receiver and analyzer records the voltage spike at point 49. The line at 50 represents the time at which the pulse emitted from point E would have passed point F, traveled to the center of the pipe where the metal coupler 48 was located, and then have reflected wave reach point F.

Then the very same procedure was followed as in the paragraph described above, except that a plastic coupler having the same configuration as the metal coupler 48 was used to joint the two lengths of pipe 47. Again, a single pulse was emitted at point E, with the point 49' representing the location at which the initial pulse passes the detecting location F, and with the line 50' indicating the time at which the reflected pulse wave would come back to the detection location F. The wave signature is shown in FIG. 10p. It can be seen that there is no significant change in the pulse wave signature from that shown in FIG. 10m.

These two initial tests of sending the single pulse and then detecting any reflection would represent results that might be obtained if it were attempted to use time domain reflectometry. The similarity of the wave form of FIGS. 10m and at 10p indicates the difficulty of obtaining meaningful information by time domain reflectometry in this particular test set up.

Then a second set of experiments was run. The test conditions were identical to those used to obtain the data for FIGS. 10m and 10p, except that this time a positive pulse of five nano seconds duration and plus three volts was emitted from point E, while a negative three volt, five nano second pulse was emitted from point D, with these being synchronized so that the point of intersection was stepped along the length of the pipe. FIG. 11m represents the wave form which resulted when the metal coupler was used. It can be seen that point 52 is the peak at which the pulse from point E passed the sensing location F. The line at 54 represents the location at which the pulse emitted from point D reaches the sensing location at point F. The timing of the pulse from points D and E were such that the point of intersection was at the middle of the pipe (i.e. at the location of the metal coupler 48.)

Figure 11P:
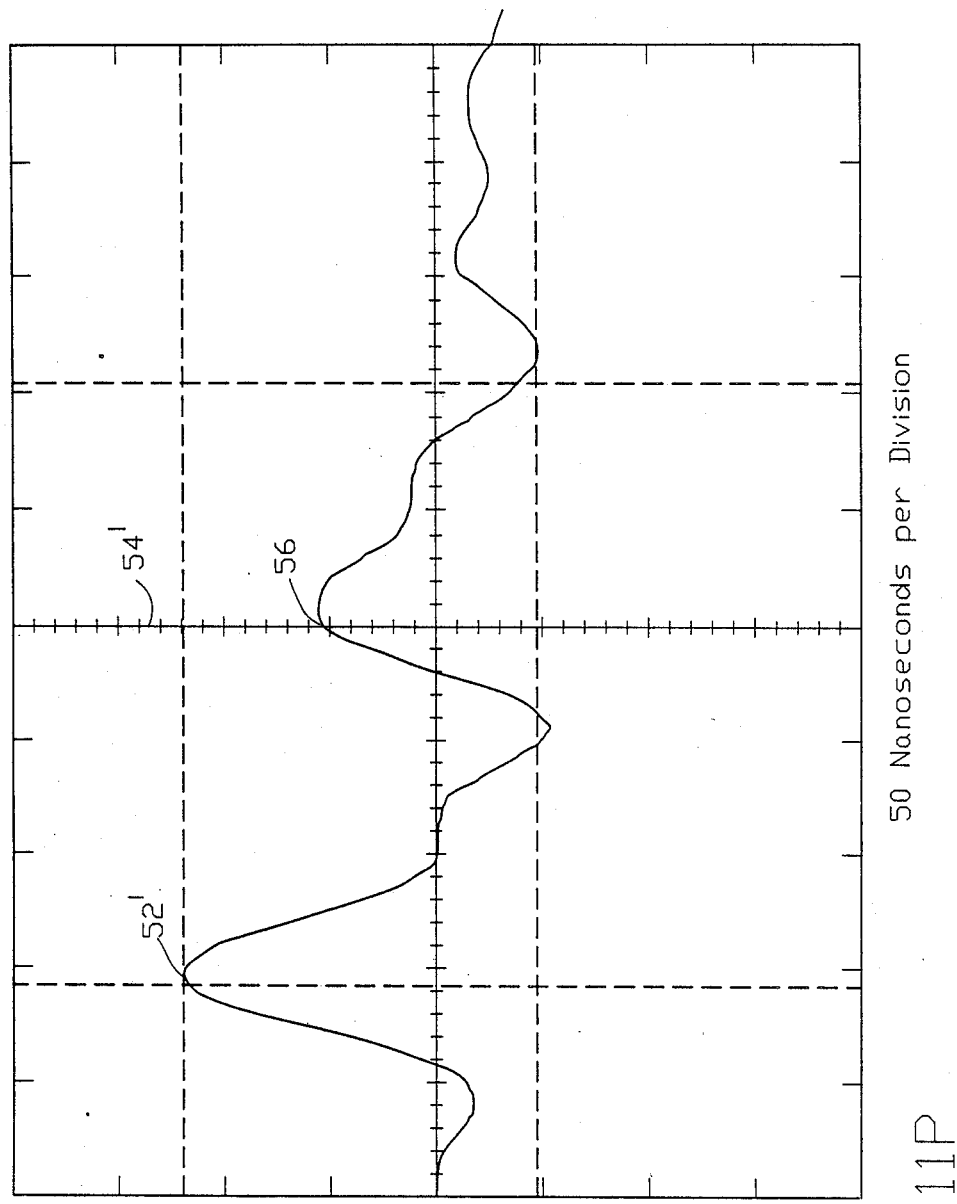
Figure 11M:
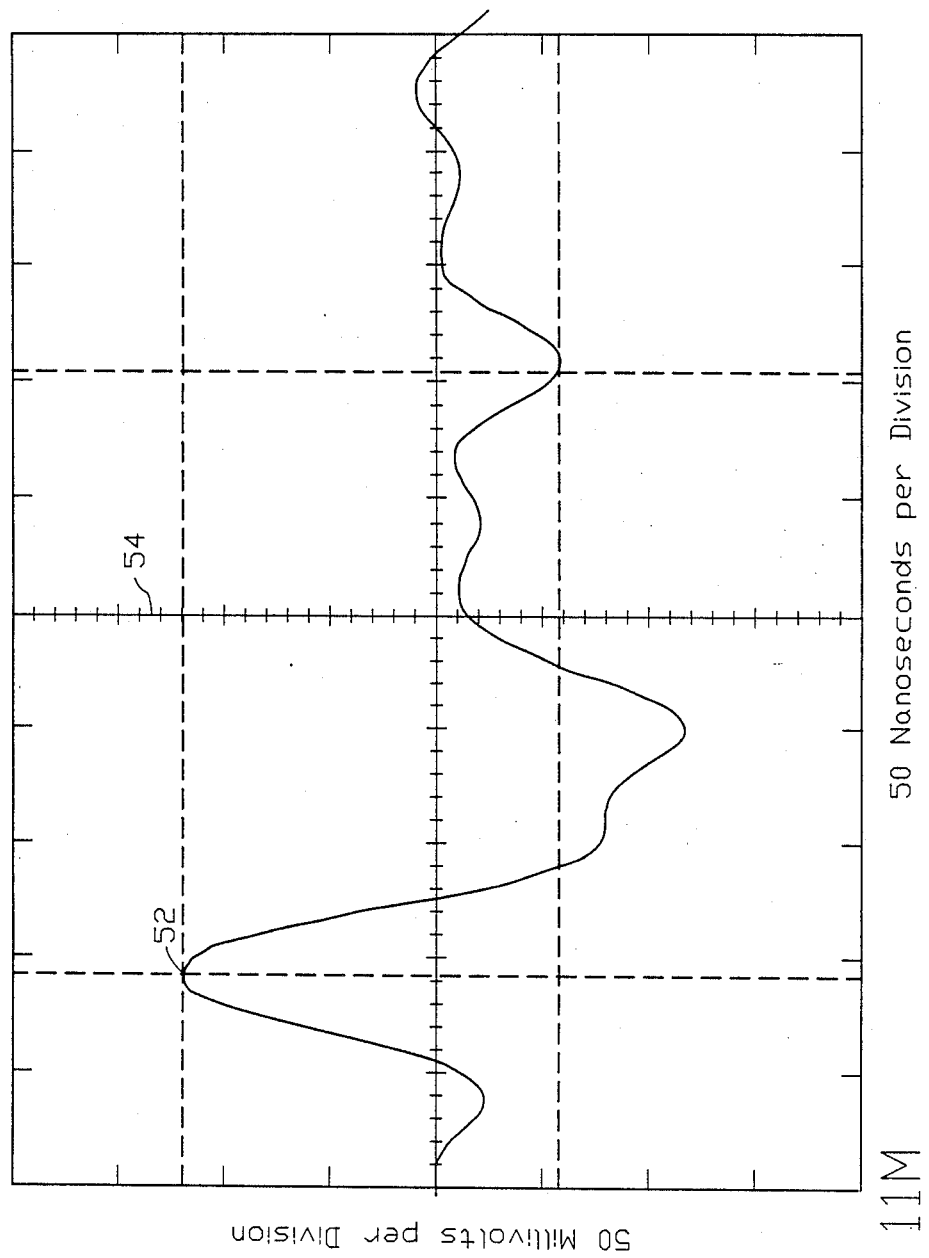

Reference is now made to FIG. 11p, where the very same procedure was followed as was done with respect to FIG. 11m, except that the plastic coupler was used to join the two lengths of pipe 47. Point 52' represents the spike of the pulse emitted from point E passing sensing location F, and the line at 54' indicates the location where the pulse from point D reaches the sensing location F. The point of intersection of the two pulses was as the location of the plastic coupler. It can be seen that there is very definite peak at 56 in the wave form shown in FIG. 11p which is not present in the graph of FIG. 11m. Thus, it becomes apparent that the mere substitution of the plastic coupler for the metal coupler produces a rather different wave signature. It should also be recalled that, with reference to FIGS. 10P and 10m, where the single pulse was emitted from point E (but no synchronized pulse from point D), there was not the significant difference in the wave form when the plastic coupler was substituted for the metal coupler. Thus, although the physical and electrical differences between plastic and metal couplers are obvious, the single pulse reflectometry tests showed no obvious differences. However the present invention clearly discriminates between the two anomalies.

Figure 12P:
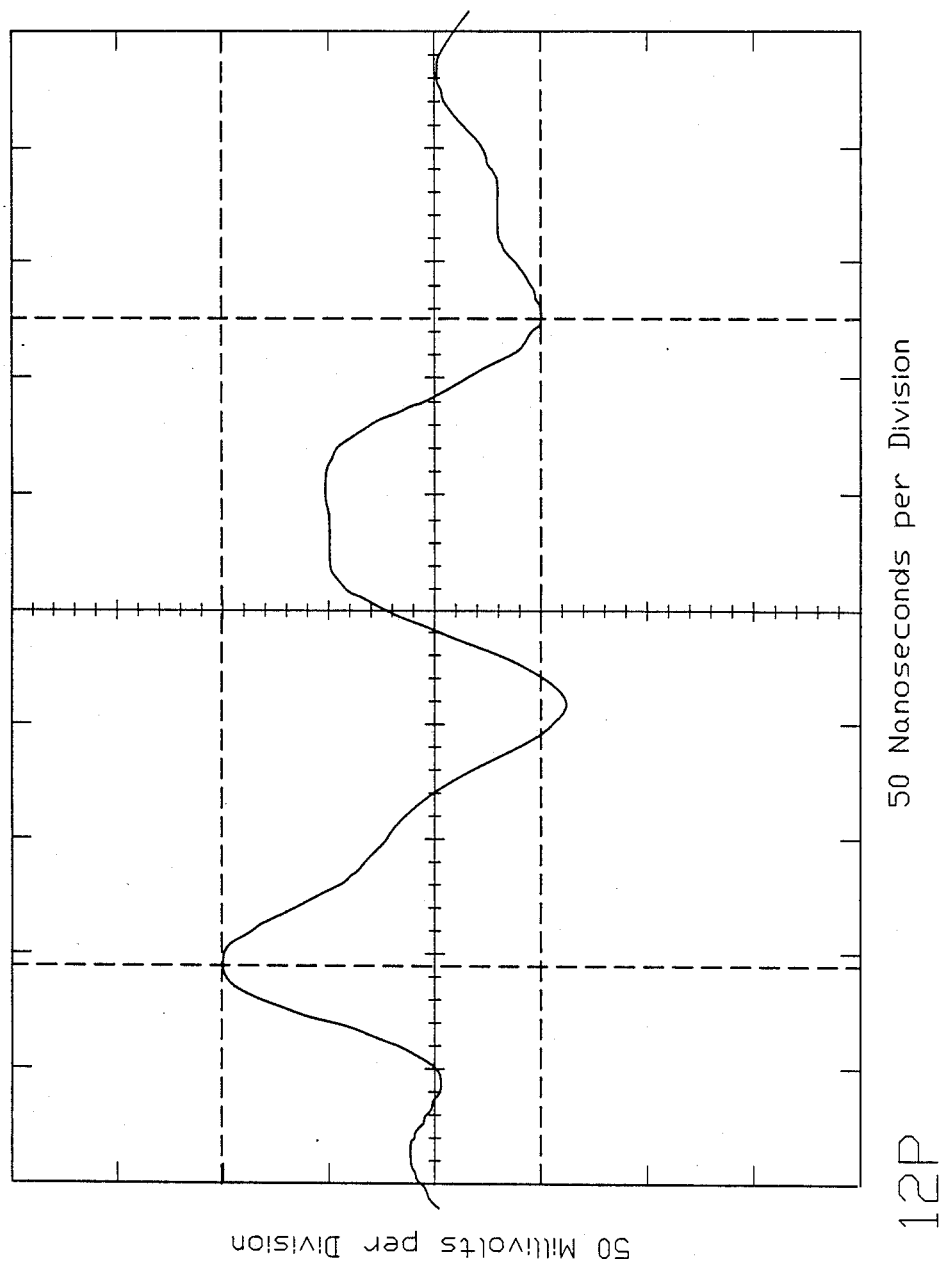
Figure 12M:
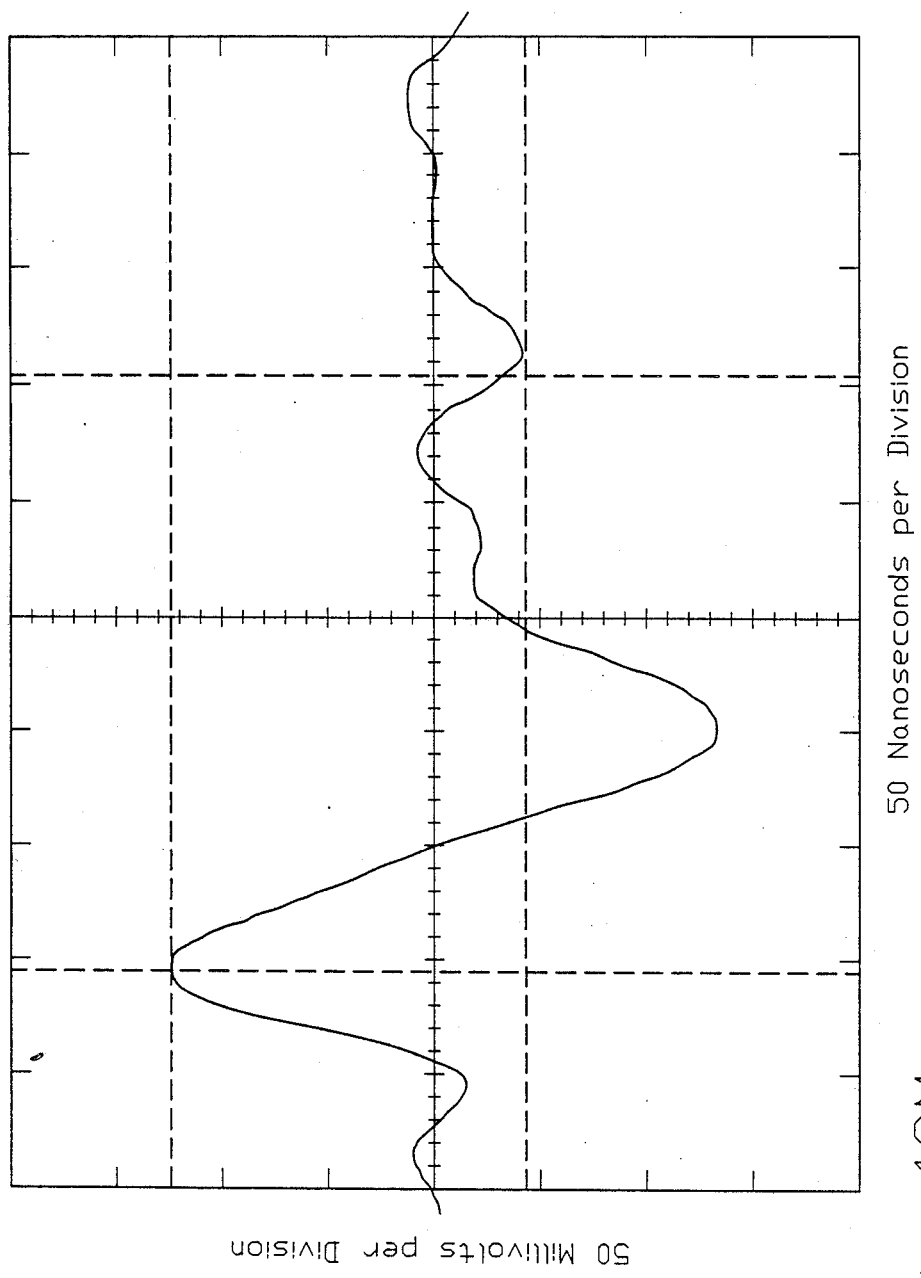

FIG. 12m represents the wave form which was obtained by conducting substantially the same experiment as described with reference to FIG. 11m, except that the pulse at the location E was initiated at location E ten nano seconds earlier than the pulse at location D was initiated, so that the intersection of the two pulses was about two and one half feet from the location of the coupler 48 toward point D. Then the same procedure was followed except that a plastic coupler was connecting the pipes, and the wave form is shown at FIG. 12p. It can be seen that the wave form of FIG. 12p is significantly different than the wave form of FIG. 12m, and also that the wave form of 12p is definitely modified from the wave form shown at 11p. Thus, it is apparent that the signatures of these wave forms not only differentiates between the metal coupler and the plastic coupler, but also indicates a different location of intersection, relative to the location of the coupler.

Figure 13P:
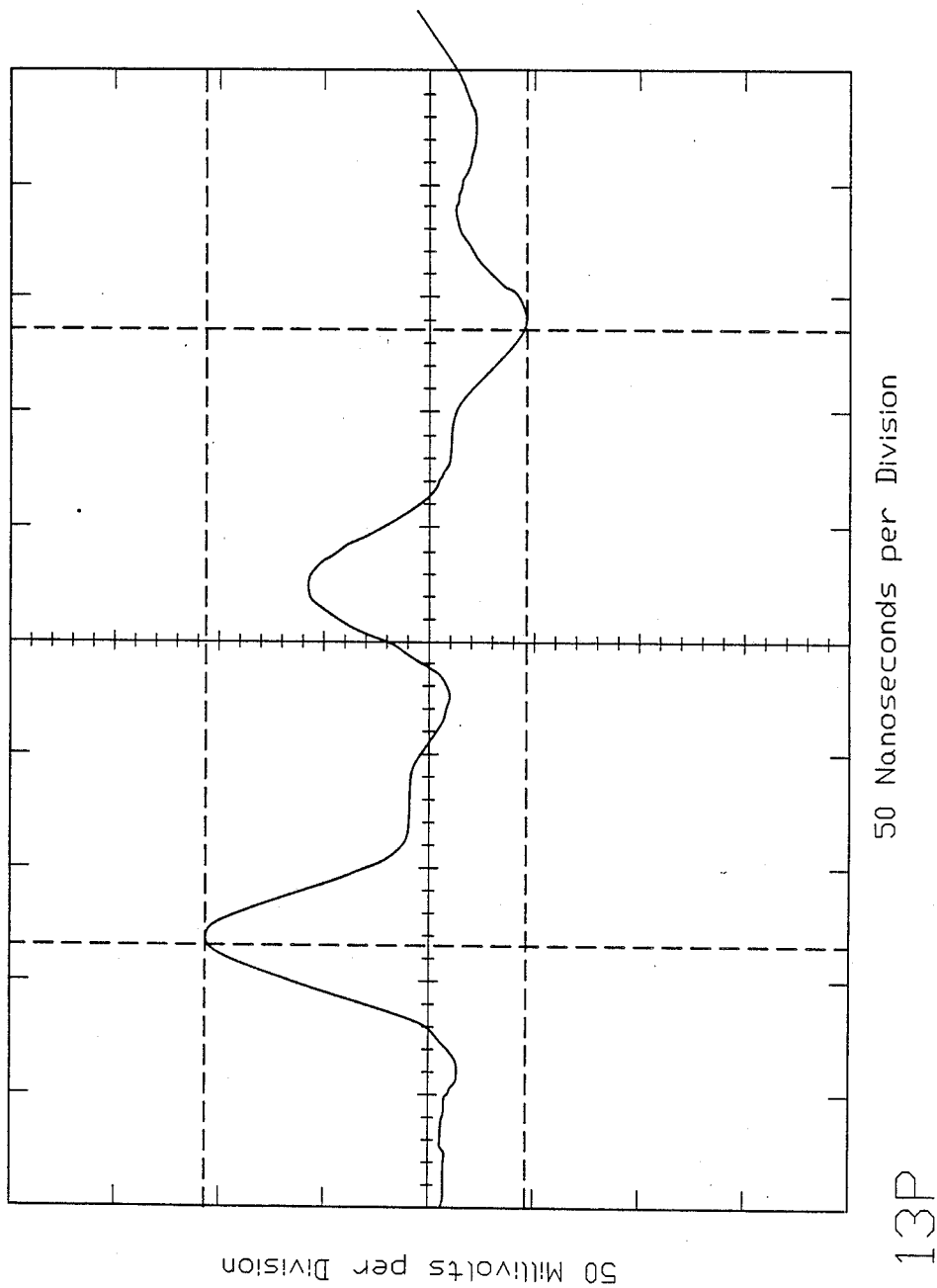
Figure 13M:
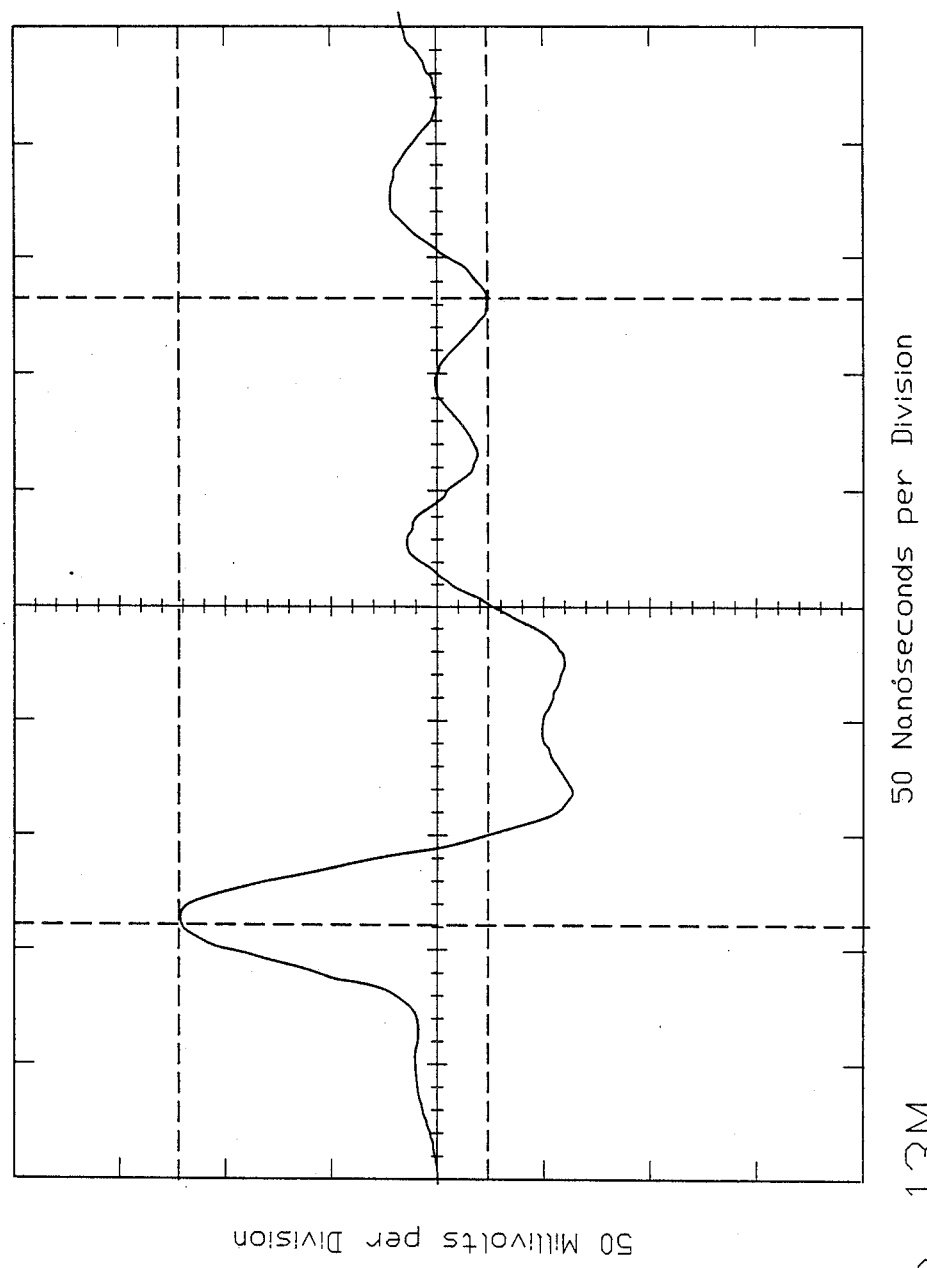

With reference to FIG. 13m, the same procedure was followed as described above, with reference to FIGS. 12m and 12p, except that in this instance the pulse was imparted to Point D ten nano seconds earlier than the pulse imparted at point E, so that the intersection would be approximately two and one half feet from the middle of the pipe toward point E. FIG. 13m shows the wave form derived with the metal coupler, while FIG. 13p shows the wave form derived from a plastic coupler. The differences in the wave forms of the graphs at FIGS. 13m and 13p are apparent, and also the differences between the wave form of FIG. 13p and FIGS. 10p, 11p, and 12p are apparent.

The applicant herein has not at this time conducted any large number of experiments relative to creating a physical anomaly in a metal pipe (such as substituting a metal coupler for a plastic coupler), but the set of experiments described above, "Example II", illustrates that the method of the present invention clearly shows different signatures of the wave forms which depend not only on the material of a coupler but also on the location of the coupler relative to the location of intersection of the pulses. Further, the differences in electrical conductivity at various locations can be detected. This also demonstrates that these significant differences do not occur when using a method that would depend upon the physical phenomenon of time domain reflectometry.

Thus, it is surmised that the method of the present invention can be used with a pipeline not only to ascertain data that would correspond to the pipe-to-soil-potentials obtained by the half-cell method of determining electrical potential between the ground and a pipe, but also would have the capability of detecting other anomalies. Much further work is required to examine the types of anomalies and the wave signatures resulting from the same, with these signatures being compared to determine what sort of differences in the wave forms indicate certain conditions.

As indicated earlier herein, this description of the present invention will be finalized by describing a system which would be suitable for use in a full scale commercial operation, such as examining conditions in a pipe line. This will be done with reference to FIG. 14. There is shown a pipe line 60, which can be an oil pipeline which would extend under ground for many miles, and at two locations on this pipe line, there are first and second pulse generators 62 and 64, respectively. These would desirably be precision pulse generators with time delay capability, such as SRS Model DG535, Hewlett Packard Model 8161A, or Berkeley Nucleonics Model 7085. These two pulse generators 62 and 64 are connected to the pipeline at a distance which could be as small as a few hundred feet, or possibly as great as one hundred miles or possibly greater. At a predetermined distance from the pulse generator 64, there is a receiving and analyzing location 66 which could be, for example, between one hundred to five hundred feet from the location of the pulse generator 64. This connection to the pipe line at 66 in turn leads to a high pass filter 68 such as a Hewlett Packard Model 1166BA, and the output from the filter is transmitted to a preamplifier 70, such as a 2-1300mhz or equivalent amplifier such as Hewlett Packard 10855A.

The output from the preamplifier 70 is directed two places, first to an analyzer 72 (.e.g. a digital oscilloscope, a spectrum analyzer, or a wave form analyzer (e.g. Tektronic Model 2430A or Hewlett Packard 54111D (two gigasample/second)), and second to a time interval probe 74, such as a Hewlett Packard Model 53638. There is also a fast precision digital counter 78, such as Hewlett Packard Model 5345A that is connected to the time interval probe 74, and the counter 78 is in turn connected to a data acquisition controller 80, such as an Hewlett Packard series 300 Technical Computer, an IBM System II, or a Concurrent Computer Corporation Scientific Laboratory System. Finally, there is a half-cell 81, such as that described previously herein, and which is used as an industry standard.

As indicated previously the pulse generators 62 and 64 connect to the pipe 60 at locations along the pipe that are many miles apart. The connection at 66 is a data collection point that is located an accurately measured distance from the connection of the pulse generator 64 to the pipe 60. This connection at 66 is used to synchronize pulses and to aide in calibrating the pulse velocity through the pipeline.

In operation, the two pulse generators 62 and 64 generate short duration pulses preferably ranging from five nano seconds to one hundred nano seconds. However, pulses of shorter or longer duration could also be practical for certain situations depending on the length of the line being tested and other circumstances. The high pass filter 68 is used to select portions of the signals arriving from the pulse generators 62 and 64 and to synchronize the pulses from pulse generator 64 with those being emitted from the pulse generator 62. The preamplifier 70 amplifies and conditions the high frequency signals to a level that can be used by the time interval probe 74. The probe 74, in conjunction with the digital counter 78, is utilized to synchronize the pulses produced by the pulse generators 62 and 64.

The propagation time of the pulse from the pulse generator 64 to the location of this connection 82 through the pipe 60 to the point 66 can be measured in several ways. One method would be to measure the delay time of a pulse from the generator 64 traveling from point 82 to point 66. The physical distance from point 82 to point 66 can be measured and the time interval can be measured by the probe 74 and the counter 78.

The data acquisition controller 80 receives the data from the digital counter and it can be programmed to simply step the point of intersection along the length of the pipeline 60 by synchronizing the pulses between the two generators 62 and 64. Also, the data acquisition controller 80 can be used to store the signature of the wave forms derived from the analyzer 72. Also, it is to be understood that the components 68-80 can be duplicated at the location of the pulse generator 62. In fact, in a commercial installation, it is likely that the components 60-81 would be duplicated at the location of the pulse generator 62, since this would enable the system to check the timing of the pulses more accurately (i.e. the time interval traveling from pulse generator 62 to pulse generator 64, and also the timing of the travel from the two pulse generators to the detection location 66).

Figure 14:
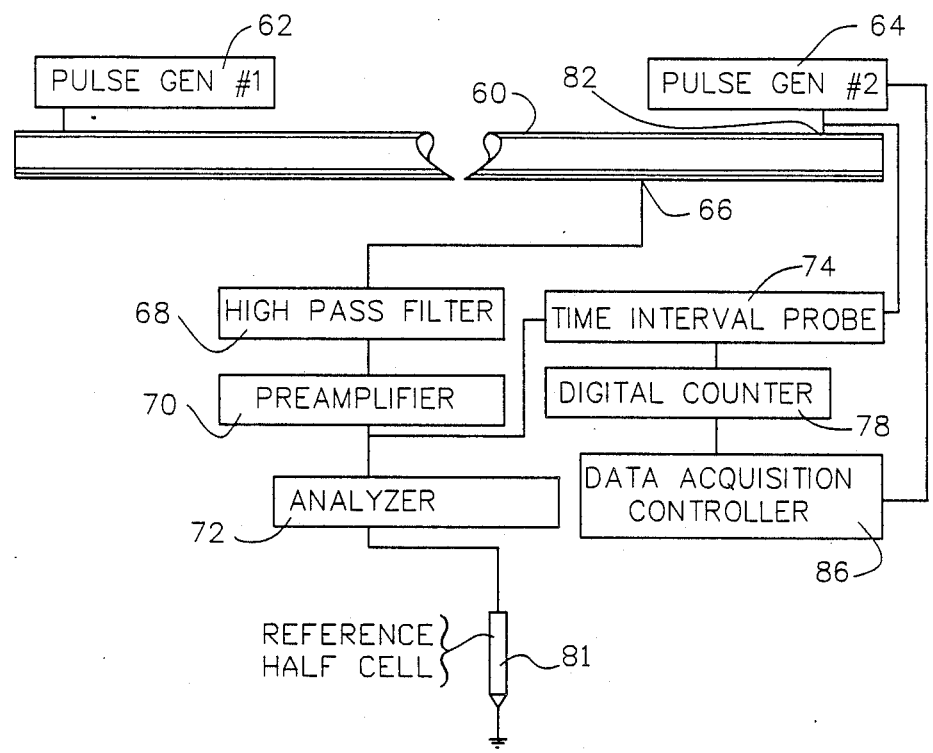
FIG. 14 is a schematic view illustrating a proposed commercial embodiment of the present invention.

It is believed that the manner in which the apparatus of FIG. 14 can be utilized to step the point of intersection along the pipeline 60 and record the wave forms is evident from the detailed description given in connection with Example I and Example II previously herein. However to summarize this briefly, in a typical operation a pulse is sent from the pulse generator 62 to travel to the location 82 adjacent to the pulse generator 64. The rate of travel of the pulse can be ascertained in a manner indicated above, and the length of the pipeline 60 would be known from the original installation. As subsequent pulses are generated from the pulse generator 62, the time interval probe 74 and the digital counter 78 can be utilized in conjunction with the data acquisition controller 80 to provide corresponding pulses from generator 64 which would be initiated at successively earlier time intervals so that the point of intersection is stepped in given increments toward the location of the pulse generator 62.

In the commercial apparatus described, the first information obtained would be correlated as described earlier with the pipe-to-soil potential obtained by the half-cell method. It is anticipated that further analysis of the stored wave forms will provide additional information, as described in Example II about physical anomalies of the pipeline.

Each wave signature is recorded by the analyzer 72 and then stored in the data acquisition controller 80. As indicated previously, the signature of the wave form will vary, depending upon the conditions at the point of intersection of the synchronized pulses generated from the pulse generators 62 and 64. As these various signatures are accumulated, they can be analyzed and compared to derive information concerning areas of anomaly along the length of the pipeline 60.

With regard to the type of analysis which can be performed, two methods were described in connection with Examples I and Examples II. However, it is to be recognized that other relationships could in all likelihood be derived from the wave signatures, and the present invention is not to be limited to the specific analysis performed in connection with Examples I and II.

Also, it is to be recognized that various other modifications could be made in the method and system of the present invention without departing from the basic teachings thereof.

What is claimed:

1. A method of detecting an anomaly along a member having a lengthwise axis, said method comprising:
   a. sending a first electrical pulse from a first location on said axis along said axis toward a second location on said axis;
   b. sending a second electrical pulse from said second location along said axis toward said first location, with said second pulse being synchronized with said first pulse in a manner that there is an intersection of said first and second pulses at a first intersecting location along said axis;
   c. detecting and analyzing at least one of said first and second pulses after passing through said intersecting location to ascertain modification of said one of said pulses.

2. The method as recited in claim 1, wherein subsequent first and second pulses are sent along said axis, and synchronization of said subsequent first and second pulses is changed to cause said intersection of the first and second pulses to move to a second intersecting location, and at least one of said subsequent first and second pulses is detected and analyzed after passing through said second intersecting location to ascertain modification in said one of said subsequent pulses.

3. The method as recited in claim 1, wherein a plurality of said first and second sets of pulses are sent along said axis, with synchronization of said sets of pulses being varied to cause intersections of said sets of pulses to be stepped to a plurality of intersecting locations, at least a first one of which intersecting locations is at a first region of possible anomaly, and at least a second one of which intersecting locations is at a second region of no anomaly, said method further comprising comparing at least a one of said pulses which intersects at said first region to another of said pulses which intersects at said second region to ascertain pulse variations to identify said first region of possible anomaly.

4. The method as recited in claim 3, wherein wave form variations between pulses are compared to ascertain said region of possible anomaly.

5. The method as recited in claim 3, wherein amplitude variations between pulses are compared to ascertain said region of possible anomaly.

6. The method as recited in claim 3, wherein said member has an electrical potential relative to an adjacent area, and a variation in electrical potential along said axis constitutes a possible anomaly.

7. The method as recited in claim 6, wherein amplitude variation of said pulses are examined to ascertain said region of possible anomaly.

8. The method as recited in claim 7, wherein said member is an underground pipe, and an electrical potential is imparted on said pipe relative to adjacent area.

9. The method as recited in claim 3, wherein said member comprises a first section of a first material and a second section of a second material, which said second section comprises an anomaly of said member.

10. The method as recited in claim 3, wherein said member comprises an elongate electrically conductive member having a region of modified electrical conductivity which is an anomaly of said member.

11. The method as recited in claim 10, wherein said member has higher electrical resistance at said region of modified electrical conductivity.

12. The method as recited in claim 11, wherein said member is a metal pipe having at said region of modified electrical conductivity a section made of a relatively high electrical resistance material.

13. The method as recited in claim 1, wherein said first and second pulses are at different voltage levels.

14. The method as recited in claim 13, wherein one of said first and second pulses is at a negative electrical potential and the other of said first and second pulses is at a positive electrical potential.

15. The method as recited in claim 13, wherein duration of said pulses is between zero to one microsecond.

16. The method as recited in claim 3, wherein duration of said pulses is between zero to one microsecond.

17. The method as recited in claim 1, wherein said one of said pulses is detected at a detecting location spaced from said first and second locations.

18. The method as recited in claim 1, wherein velocity of said pulses is determined by measuring a time period during which a pulse is transmitted a predetermined distance along said axis, and said intersecting location is moved predetermined increments of distance along said axis by changing synchronization of said pulses by time increments corresponding to distance of movement of said intersecting location along said axis.

19. A method of detecting a region of possible anomaly along an underground pipeline where an electrical potential is imposed on said pipeline, said method comprising:
 a. transmitting sets of first and second pulses at first and second transmitting locations spaced from one another along the lengthwise axis of said pipeline;
 b. synchronizing the first and second pulses of each set with one another in a manner that the first and second pulses of each set intersect one another at a related intersecting location along the lengthwise axis of the pipeline;
 c. detecting and analyzing at least one of said first and second pulses from each set;
 d. synchronizing the pulses of each set with respect to one another in a manner that the intersecting location of each set is moved along the lengthwise axis of the pipeline and continuing to detect and analyze at least one of these pulses of each set to ascertain a region of possible anomaly along said pipeline.

20. The method as recited in claim 19, wherein amplitude variations between pulses are compared to ascertain said region of possible anomaly.

21. The method as recited in claim 19, wherein said first and second pulses are at different voltage levels.

22. The method as recited in claim 21, wherein one of said first and second pulses is at a negative electrical potential and the other of said first and second pulses is at a positive electrical potential.

23. The method as recited in claim 19, wherein duration of said pulses is between zero to one microsecond.

24. The method as recited in claim 19, wherein said one of said pulses is detected at a detecting location spaced from said first and second locations.

25. The method as recited in claim 19, wherein velocity of said pulses is determined by measuring a time period during which a pulse is transmitted a predetermined distance along said axis, and said intersecting location is moved predetermined increments of distance along said axis by changing synchronization of said pulses by time increments corresponding to distance of movement of said intersecting location along said axis.

26. The method as recited in claim 19, wherein pulses signatures which are detected are correlated to pipe-to-soil-potential values.

27. A system for detecting an anomaly along a member having a lengthwise axis, said system comprising:
 a. first transmitting means to transmit a first electrical pulse from a first location on said axis along said axis toward a second location on said axis;
 b. second transmitting means to send a second electrical pulse from said second location along said axis toward said first location;
 c. synchronizing means operatively connected to said first and second transmitting means to control timing of transmission of said first and second pulses in a manner that said first and second pulses intersect one another at an intersecting location on said axis, said synchronizing means being characterized in that it is selectively operable to change the timing of said pulses of each set in a manner that the intersecting location can be moved along said axis;
 d. detecting and analyzing means operatively connected to said member at a detecting location to receive at least one of said first and second pulses after passing through said intersecting location to ascertain modifications in said one of said pulses.

28. The system as recited in claim 27, wherein said first and second transmitting means transmits a plurality of said first and second pulses along said axis, said synchronizing means being arranged to vary synchronization of said sets of pulses to cause intersections of said sets of pulses to be stepped to a plurality of intersecting locations.

29. The system as recited in claim 27, wherein said first and second transmitting means transmits first and second pulses at different voltage levels.

30. The system as recited in claim 29, wherein one of said first and second pulses is at a negative electrical potential and the other of said first and second pulses is at a positive electrical potential.

31. A system for detecting a region of possible anomaly along an underground pipeline where an electrical potential is imposed on said pipeline, said system comprising:
 a. first and second transmitting means to transmit set of first and second pulses, respectively, at first and second transmitting locations spaced from one another along the lengthwise axis of said pipeline;
 b. synchronizing means to synchronize the first and second pulses of each set with one another in an manner that the first and second pulses of each set intersect one another at a related intersecting location along the lengthwise axis of the pipeline, said synchronizing means being arranged so that the pulses of each set are synchronized with respect to one another in a manner that the intersecting location of each set is moved along the lengthwise axis of the pipeline;
 c. detecting and analyzing means to detect and analyze at least one of said first and second pulses from each set.

32. The system as recited in claim 31, wherein said first and second pulses are at different voltage levels.

33. The system as recited in claim 32, wherein one of said first and second pulses is at a negative electrical potential and the other of said first and second pulses is at a positive electrical potential.

34. The system as recited in claim 33, wherein duration of said pulses is between zero to one microsecond.

35. The system as recited in claim 31, wherein duration of said pulses is between zero to one microsecond.

36. The system as recited in claim 31, wherein detecting and analyzing means detects said one of said pulses at a detecting location spaced from said first and second locations.

37. A method of detecting an anomaly along a member having a lengthwise axis, said method comprising:

a. sending a first electrical pulse from a first location on said axis along said axis toward a second location on said axis;

b. sending a second electrical pulse from said second location along said axis toward said first location, with said second pulse being synchronized with said first pulse in a manner that there is an intersection of said first and second pulses at a first intersecting location along said axis;

c. detecting and analyzing an interference pattern created as the result of the first and second pulses intersecting at the intersecting location.

* * * * *